United States Patent [19]
Seki et al.

[11] Patent Number: 5,610,842
[45] Date of Patent: Mar. 11, 1997

[54] METHOD OF ANIMATION PLOTTING OF NC MACHINING PROGRAM

[75] Inventors: Masaki Seki, Tokyo; Teruyuki Matsumura, Hachioji; Satoru Shinozaki, Shimodate, all of Japan

[73] Assignee: Fanuc Ltd., Yamanashi, Japan

[21] Appl. No.: 240,734

[22] PCT Filed: Aug. 24, 1993

[86] PCT No.: PCT/JP93/01182

§ 371 Date: May 11, 1994

§ 102(e) Date: May 11, 1994

[87] PCT Pub. No.: WO94/07189

PCT Pub. Date: May 31, 1994

[30] Foreign Application Priority Data

Sep. 16, 1992 [JP] Japan .................. 4-270722

[51] Int. Cl.⁶ .................. G06F 15/16; G05B 19/18
[52] U.S. Cl. .................. 364/551.02; 364/474.22; 364/474.26; 82/118; 345/115; 395/173
[58] Field of Search .................. 364/474.2–474.23, 364/474.26, 191, 188, 192, 551.02; 82/118–120; 345/115–120; 395/152

[56] References Cited

U.S. PATENT DOCUMENTS

| | | | |
|---|---|---|---|
| 4,878,172 | 10/1989 | Matsumura | 364/474.23 X |
| 4,922,440 | 5/1990 | Kawamura et al. | 364/474.22 |
| 4,926,311 | 5/1990 | Matsumura et al. | 364/474.22 X |
| 4,978,901 | 12/1990 | Hirai | 364/474.22 X |
| 5,005,134 | 4/1991 | Nakashima et al. | 364/474.01 |
| 5,337,249 | 8/1994 | Fujita et al. | 364/474.22 |
| 5,359,530 | 10/1994 | Matsumura et al. | 364/474.26 |
| 5,383,110 | 1/1995 | Fujita et al. | 364/474.22 X |

FOREIGN PATENT DOCUMENTS

| | | |
|---|---|---|
| 58-15541 | 9/1983 | Japan . |
| 61-30360 | 2/1986 | Japan . |
| 62-281013 | 12/1987 | Japan . |
| 63-24307 | 2/1988 | Japan . |
| 63-91707 | 4/1988 | Japan . |
| 4-114208 | 4/1992 | Japan . |

OTHER PUBLICATIONS

Abstract: Matsumura et al; "Animation drawing system NC Device for multi–series cathe"; Japanese Application No. 03–195079, Jul. 10, 1991.

*Primary Examiner*—Emanuel T. Voeltz
*Assistant Examiner*—Kamini Shah
*Attorney, Agent, or Firm*—Staas & Halsey

[57] ABSTRACT

A method of animation plotting by an NC machining program on an NC lathe having a multiplicity of tool rests. The method provides animation plotting for Y-axis machining such as engraving. A display screen of a CRT/MDI provides first display areas "a1" to "an" for simulating a machining process of a workpiece projected in an axial direction of a tool. A second display area is also provided for simulating a machining process of the workpiece projected in the direction of a Y-axis orthogonal to an X-axis and a Z-axis. For each rotational positioning point $\theta_i$ (i=1 to n) of the spindle, Y-axis machining is simulated by simultaneously displaying the movement path of the tool and the shape of the tool within the first display area "ai" and the second display area.

6 Claims, 5 Drawing Sheets

FIRST DISPLAY AREA    SOFTKEY    SECOND DISPLAY AREA

METHOD OF ANIMATION PLOTTING OF NC MACHINING PROGRAM

TECHNICAL FIELD

The present invention relates to an improved method of animation plotting of an NC machining program.

BACKGROUND ART

Figure 6:
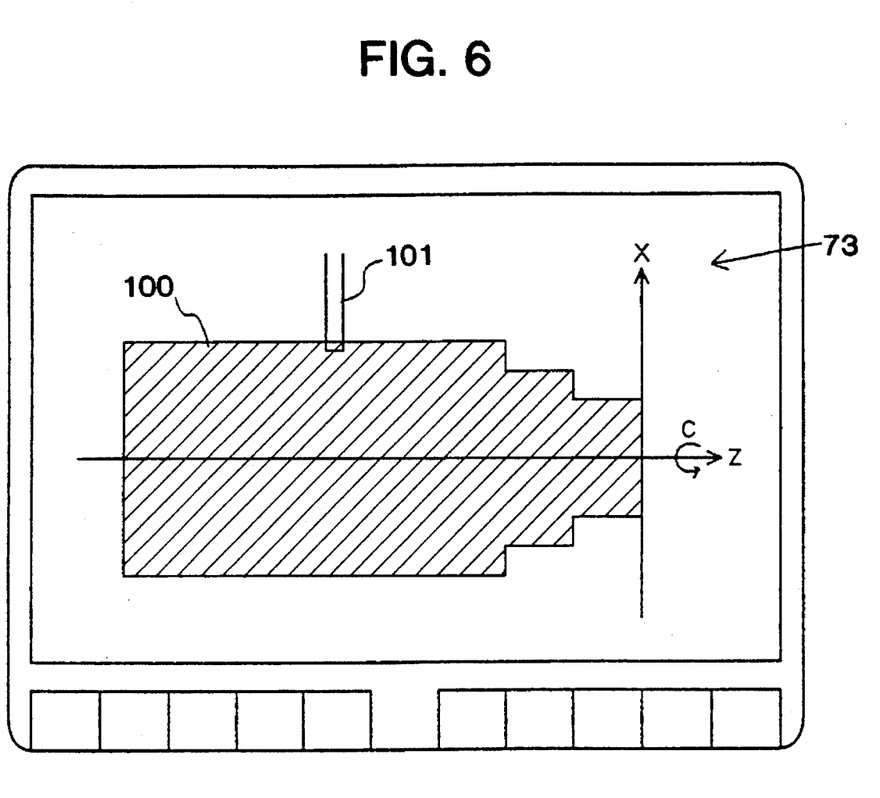

There is known an animation plotting method in which an NC machining program simulates a profile of a workpiece viewed from the direction orthogonal to a spindle and the axis of a tool on a graphic display screen of an NC system. FIG. 6 depicts an example where, in turning a workpiece 100 rotated around a horizontal axis Z by a spindle with a cutting tool 101 such as a turning tool mounted along a vertical axis X, the profile of the workpiece is plotted on a graphic display screen 73 in accordance with a conventional animation plotting method.

The movement of the tool 101 during ordinary turning operation is limited to cutting in an X-axis direction and feeding in a Z-axis direction, and hence the change in outer diameter of the workpiece 100 rotating around the Z-axis is always constant. Thus, the NC machining program can be fully checked by merely plotting the turning condition of the workpiece 100 viewed from the direction of a Y-axis orthogonal to the Z-axis and the X-axis as shown in FIG. 6.

Figure 5:
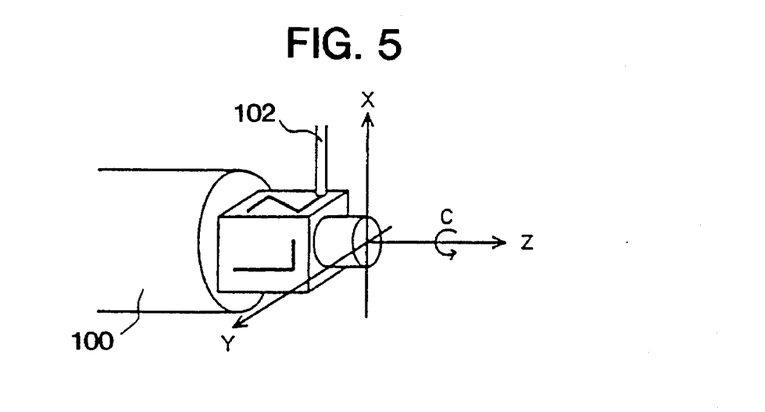
FIG. 5 is a diagram illustrating an example of machining by an NC lathe.

Recently, however, as shown in FIG. 5, there has become available an NC lathe having a multiplicity of tool rests, which are not only capable of performing the turning machining but also capable of performing the plane cutting and engraving on the planed outer peripheral surface of the workpiece 100 by controlling the position of the spindle for a desired rotational point (C-axis control). In this type of NC lathe, the tool 102 is displaceable in all directions of the X, Y and Z axes, and the machining surface on the workpiece 100 is not necessarily in parallel with the X-Z plane. It is therefore difficult for the conventional plotting method as is shown in FIG. 6, or for the plotting method of plotting the cutting condition of the workpiece 100 viewed from the direction of the Y-axis, to fully check the NC machining program.

DISCLOSURE OF THE INVENTION

The present invention provides a method of animation plotting of an NC machining program, capable of more easily and securely checking the NC machining program for an NC lathe having a multiplicity of tool rests.

A method of animation plotting of an NC machining program of the present invention comprises the step of dividing the graphic display screen into a first display area for plotting a workpiece projected in the direction of a first axis (axis of the tool) orthogonal to the direction of the spindle and a second display area for plotting a workpiece projected in the direction of a second axis orthogonal to the spindle and the first axis. The method also comprises the step of simultaneously displaying the state of movement of the tool relative to the workpiece, which is obtained by simulating the NC machining program, within the first display area and the second display area.

According to one aspect of the present invention, the first display area is divided into a plurality of sub-display areas corresponding to the number of rotational positioning points of the spindle for machining by the tool; one of the sub-display areas is selected in sequence in accordance with the rotational positioning points of the spindle; and the state of movement of the tool relative to the workpiece is simultaneously displayed within the selected one sub-display area and the second display area.

According to another aspect of the present invention, the state of movement of the tool relative to the workpiece is displayed synchronously within the first display area and the second display area.

BRIEF DESCRIPTION OF DRAWINGS

FIG. 8 is a conceptual diagram showing a conventional example of the animation plotting processing.

BEST MODE FOR CARRYING OUT THE INVENTION

Figure 1:
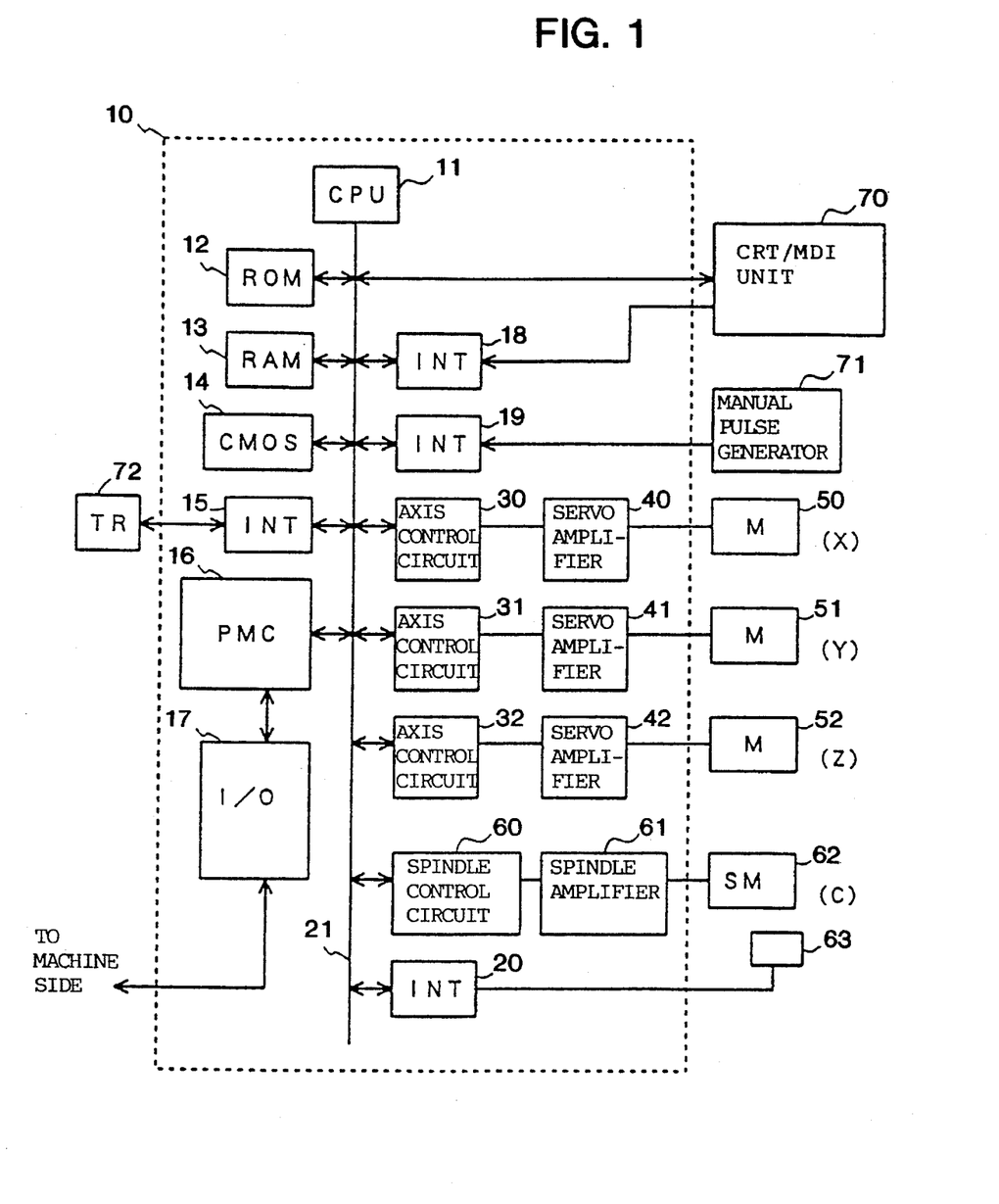
FIG. 1 is a block diagram showing an embodiment of hardware of an NC apparatus for practicing a method in accordance with the present invention.

FIG. 1 is a block diagram showing an embodiment of hardware of an NC (numeric control) system 10 for practicing the present invention. A processor 11 is a processor for generally controlling the NC system 10. The processor 11 reads out a system program stored within a ROM 12 by way of a bus 21, and generally controls the NC system 10 according to this system program. Stored within RAM 13 are temporary calculation data, display data, and a variety of data inputted by an operator via a CRT/MDI unit 70. A CMOS memory 14 is backed up by a battery not shown and serves as a nonvolatile memory in which a storage condition remains intact even though the power source of the NC system 10 is turned off. The CMOS memory 14 stores an NC machining program read through an interface 15 and an NC machining program inputted through the CRT/MDI unit 70. Previously written within the ROM 12 are a variety of system programs for executing an edit mode processing which is necessary for the creation and editing of NC machining programs, a reproduction mode processing for automatic operation, and an animation plotting processing for checking the NC machining programs.

The interface 15 is an interface intended for external equipment capable of being connected to the NC system 10. Coupled with the interface 15 are external equipment 72 such as a paper tape reader, a paper tape puncher and an external storage device. The NC machining programs, etc., are read in through the paper tape reader or the external storage device, and the NC machining programs edited within the NC system 10 can be output to the paper tape puncher or the external storage device.

A PMC (Programmable Machine Controller) 16 controls auxiliary devices on the side of an NC lathe, for example, actuators such as robot hands for the replacement of tools, based on sequence programs incorporated into the NC system 10. More specifically, in accordance with an M-function, an S-function, and a T-function instructed by an NC machining program, the PMC 16 converts inputs signals into output signals required on the side of the auxiliary devices by these sequence programs in order to output them through an input/output unit 17 to the auxiliary devices. In response to these output signals, the auxiliary devices such as a variety of actuators are activated. The PMC 16 receives the input signals from limit switches provided on the side of the body of the NC lathe and the auxiliary devices, as well as from a variety of switches of a console panel arranged on the body of the NC lathe, and passes them to the processor 11 by way of a necessary processing.

Image signals representing the current positions of each axis of the NC lathe, alarms, parameters, image data and so on are sent to the CRT/MDI unit 70 and displayed on its graphic display. The CRT/MDI unit 70 is a manual data input device equipped with a graphic display, a keyboard, and a variety of softkeys, etc. The interface 18 receives data from the keyboard of the CRT/MDI unit 70 and passes the data to the processor 11. A so-called automatic programming operation can also be executed, in which NC machining programs are created in an interactive mode by activating a system program for automatic programming stored within the ROM 12 to display an interactive screen on the graphic display of the CRT/MDI unit 70 to input simple data with respect to the shapes of products and so on. An interface 19 is coupled with a manual pulse generator 71 and receives pulses from the manual pulse generator 71. The manual pulse generator 71 is mounted on the console panel of the body of the NC lathe and is used for precisely positioning the movable parts of the NC lathe by controlling each axis with distribution pulses based on manual operation.

Axis control circuits 30 to 32 receive movement commands for respective axes from the processor 11 and output the commands for respective axes to servo amplifiers 40 to 42, respectively. The servo amplifiers 40 to 42 receive these commands and drive servomotors 50 to 52 associated with respective axes for moving a tool such as an engraving end mill of the NC lathe. The servomotors 50 to 52 associated with respective axes each incorporates a pulse coder for positional detection. Positional signals from the pulse coder are fed back in the form of a pulse train. Depending on the case, a linear scale may be used as a positional detector. Furthermore, this pulse train can be converted into speed signals through an F/V (frequency/velocity) conversion. In FIG. 1, the explanation of feedback of these positional signals and velocity feedback is omitted.

A spindle control circuit 60 receives a spindle rotation command for the NC lathe and outputs spindle speed signals to a spindle amplifier 61. The spindle amplifier 61 receives the spindle speed signals to rotate a spindle motor 62 at a commanded rotational speed. A position coder 63 is coupled via gears or a belt with the spindle motor 62. The position coder 63 outputs feedback pulses synchronously with the rotation of the spindle. The feed back pulses are read via an interface 20 by the processor 11. In a case such that the rotational position of the spindle is set to a predetermined point designated by the NC machining program, etc., to perform Y-axis machining by the engraving end mill or the like, a one-rotation signal from the position coder 63 is detected to perform a rotational position control of the spindle, that is, C-axis control through processing by the processor 11, thereby enabling the spindle to be stopped and held at the predetermined positioning point.

Figure 2:
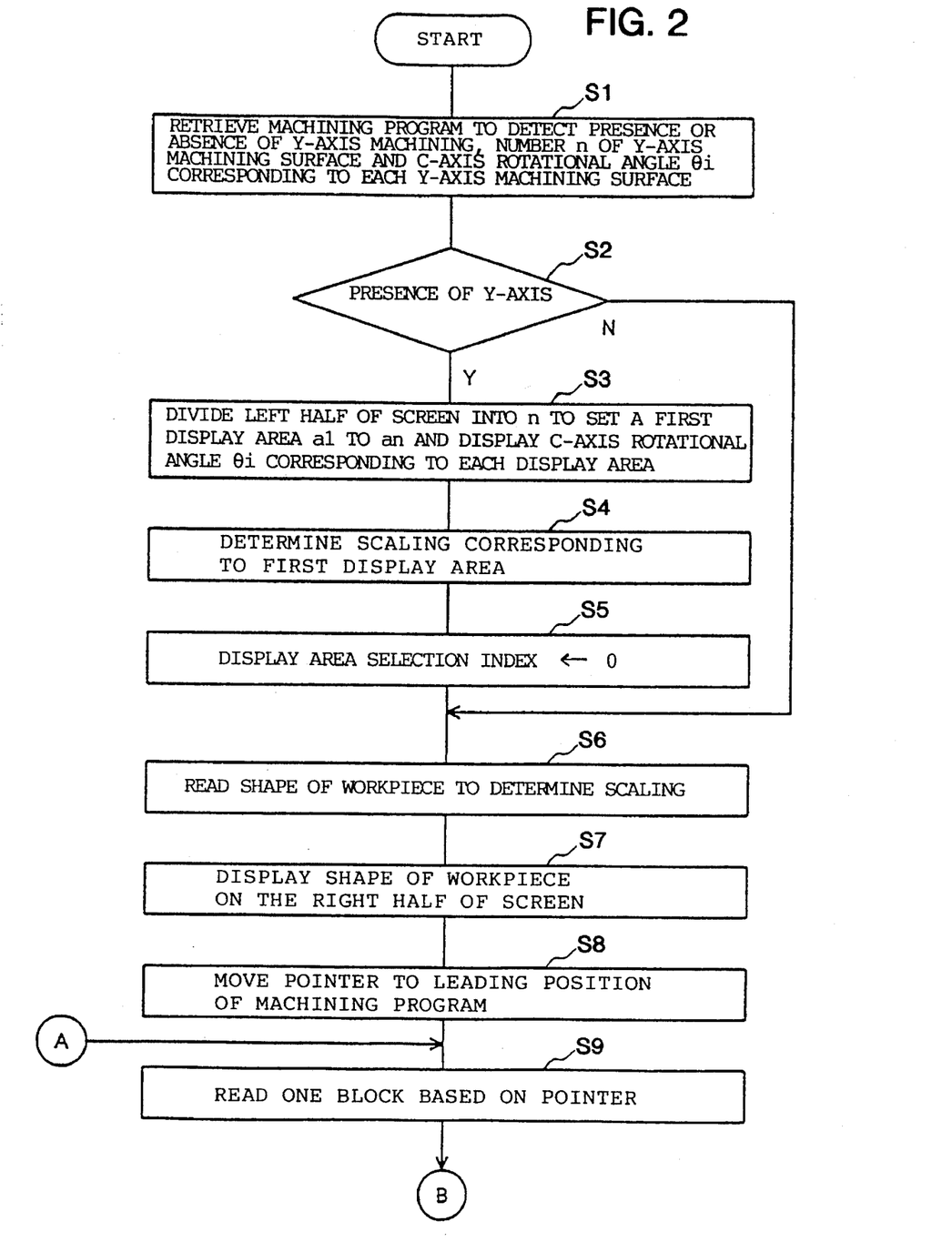
FIG. 2 is a flowchart schematically showing an animation plotting processing in accordance with the present invention to be executed by the NC apparatus shown in FIG. 1.
Figure 3:
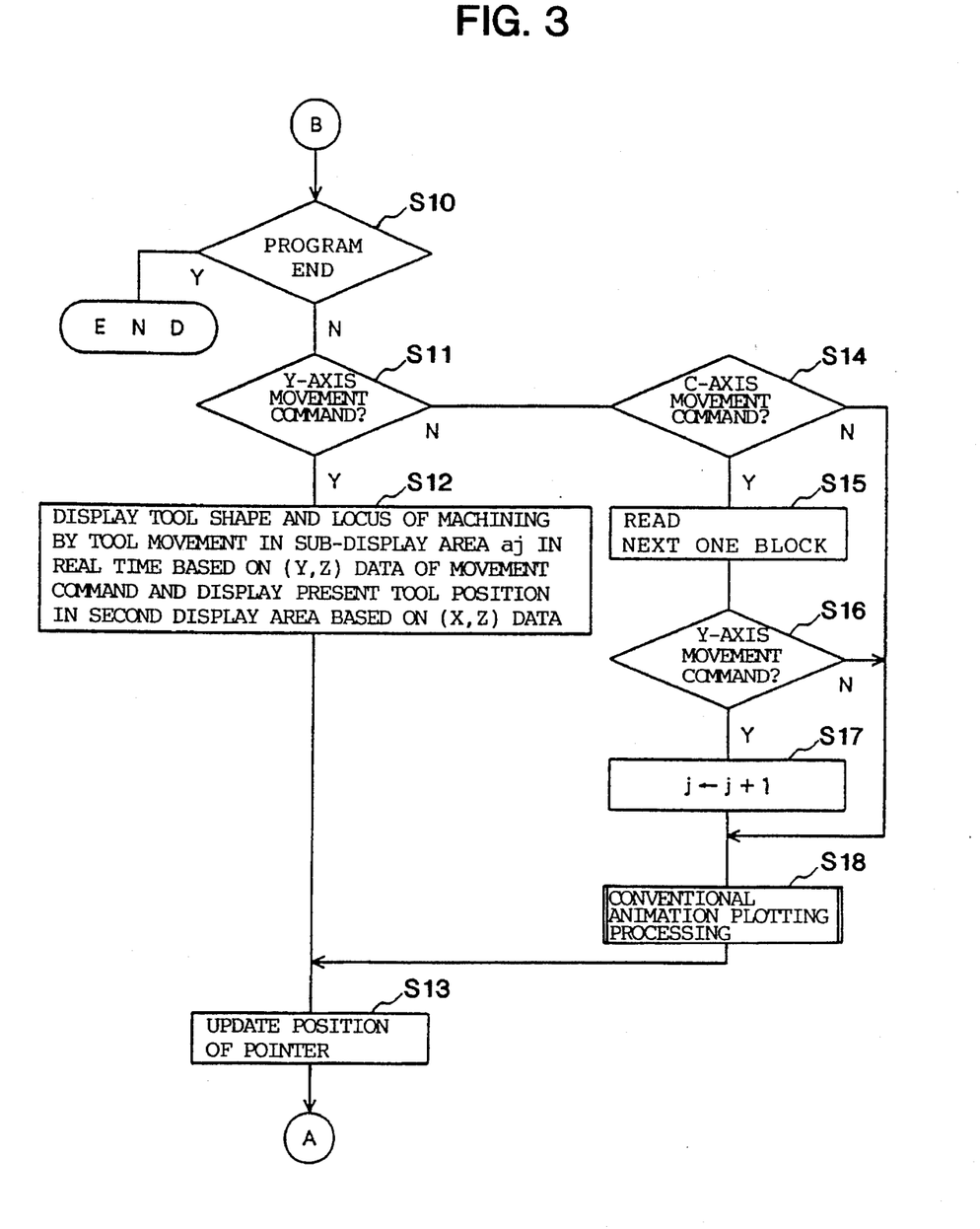
FIG. 3 is a continuation of the flowchart shown in FIG. 2.

FIGS. 2 and 3 are flowcharts schematically showing an animation plotting processing for lathe machining which is preserved in the form of a system program within the NC system 10 in an embodiment of the present invention. This system program is activated by operating predetermined softkeys arranged on the CRT/MDI unit 70.

As shown in FIG. 5, the processing action of the NC system 10 will now be described with an example of the NC machining program, in which four cut plane surfaces of a workpiece 100 obtained by rotating the spindle every 90° are respectively engraved by the end mill 102 as a machining along the Y-axis (Y-axis machining). The machining program for executing machining as shown in FIG. 5 has already been created by the automatic programming function of the NC system and preserved within the CMOS memory 14. The machining is executed in the order of peripheral turning, plane cutting, and Y-axis machining such as engraving, that is, in the same order as the manual machining using a general purpose lathe, a general purpose milling cutter, etc., and the NC machining programs are created conforming to this order.

The processor 11, which has detected the operation of the softkeys and initiated the animation plotting processing, reads in sequence the NC machining program preserved within the CMOS memory 14 to retrieve all blocks in Step S1. The processor 11 detects the presence or absence of Y-axis machining, and, if the Y-axis machining is present, the processor detects n, the number of rotational positioning points of the spindle for Y-axis machining and the spindle rotational angles θi (i=1 to n) corresponding to respective rotational positioning points. Then, the processor 11 determines in Step S2 whether or not Y-axis machining blocks have been detected within the NC machining program. Even if only one Y-axis machining block has been detected, the processor 11 advances to Step S3 in which the left half of the graphic display screen 73 of the CRT/MDI unit 70 is set as a first display area based on the number n of the rotational positioning points detected in Step S1. The first display area is further vertically and equally divided into n sub-display areas a1 to an. On the screen there appear spindle rotational angles θi (i=1 to n) corresponding to the sub-display areas a1 to an.

Figure 4:
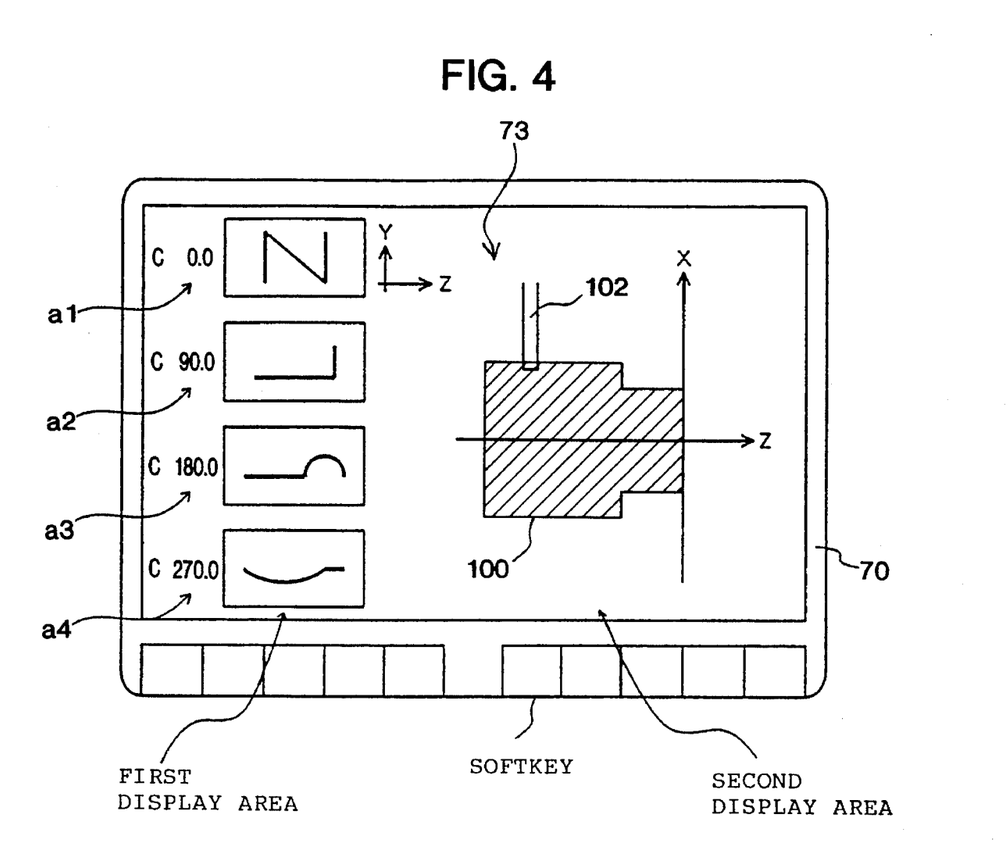
FIG. 4 is a diagram showing an example of a display appearing on a graphic display by the animation plotting processing.

In the example of machining of FIG. 5, as shown in FIG. 4, the left half of the graphic display screen 73 is set as a first display area, which in turn vertically and equally divided further into four sub-display areas a1 to a4. The spindle rotational angles 0°, 90°, 180°, and 270° are displayed in the corresponding sub-display areas a1 to a4. FIG. 4 shows the final graphic display state of screen 73, at which stage the tool path is not displayed within the sub-display areas a1 to an.

The processor 11 advances to Step S4, in which an automatic scaling processing in the conventional manner is executed in accordance with the magnitude (the same for i=1 to n) of the sub-display area ai and the magnitude (which may possibly vary depending on i=1 to n) of the machining area at every rotational positioning point i for the Y-axis machining, thereby determining a display magnification ki of the tool path for the sub-display area ai. In Step S5, a display area selection index j is set to 0.

In the case where no Y-axis machining block is detected within the NC machining program through the retrieval processing of Step S1, the processings of Steps S3 to S5 are not executed, and hence the first display area is not allowed to be set. If, for example, the number n of the rotational positioning points detected in Step S1 is 1, the entirety of the left half of the graphic display screen 73, constituting the first display area, is used as a single sub-display area a1.

Then, the processor 11 advances to Step S6, in which an automatic scaling processing in the conventional manner is carried out based on shape data of the workpiece 100 stored in the NC machining program preserved within the CMOS memory 14 and the presence or absence of the Y-axis machining which has already been detected, to determine a display magnification k0 of the workpiece 100 for the right half of the graphic display screen 73 constituting a second display area. The processor 11 advances to Step S7 in which the shape of the workpiece 100 is displayed on the right half of the graphic display screen 73.

Since the right half of the graphic display screen 73 is usually utilized as the second display area, the display magnification k0 is set to a value enabling the workpiece 100 and the tool 102 to be contained within the right half of the graphic display screen 73. However, in the case where any Y-axis machining block is not detected at all through the retrieval processing of Step S1, that is, the present NC machining program includes only turning machining but does not include the Y-axis machining, the entirety of the graphic display screen 73 can be utilized as the second display area in the same manner as the conventional example shown in FIG. 6. Accordingly, the display magnification k0 is determined based on not only the shape data but also the presence or absence of the Y-axis machining.

The processor 11, which has completed the setting of the display area and the display of the shape of the workpiece 100, advances to Step S8, in which a pointer for determining the start position of the program is moved to the leading position of the NC machining program, and then to Step S9, in which the blocks of the NC machining program are read one by one according to the present position of the pointer. The processor 11 further advances to Step S10, in which it is judged whether or not the block read in Step S9 indicates the program end.

Unless the block read in Step S9 indicates the program end, the processor 11 advances to Step S11 in order to judge whether or not the present one block is a Y-axis movement command for executing the Y-axis machining. In this case, any Y-axis movement command is not detected at the leading edge of the program. This is due to the fact that the NC machining program including Y-axis machining is composed of peripheral turning, plane cutting, and Y-axis machining as described earlier. In order to execute the Y-axis processing, a plane cut surface as an object of the Y-axis machining must be made to confront a position orthogonal to the tool 102 by previously designating a rotational positioning point of the spindle. There exists at least a C-axis movement command relating to the positioning of the spindle prior to the execution of the Y-axis processing.

The processor 11 moves from Step S11 to Step S14 to judge whether the one block read in Step S9 is the C-axis movement command for designating the rotational positioning point of the spindle. If this one block is not the C-axis movement command, that is, if it is a rotational speed command for turning with respect to the spindle, or a cutting or feeding command with respect to the tool rest for the edges other than the Y-axis machining tool, such as for use with a turning tool, the processor 11 advances to Step S18. In the same manner as the conventional example shown in FIG. 6, the turning state of the workpiece 100 is then simulated based on the shape of the tool designated by the program, cutting, feed speed, etc. The movement of the tool and the variation in the shape of the workpiece 100 are then plotted in real time within the second display area of the graphic display screen S13.

The processor 11, which has completed the plotting processing for one block of the NC machining program, advances to Step S13 to update the position of the pointer for determining the position for reading the program, and then to Step S9 to read the next block from the NC machining program based on the current position of the pointer. Thereafter, as far as the NC machining program relating to the peripheral turning lasts, the processor 11 repeatedly executes the processings of Steps S9 to S11, S14, S18 and S13. By the same animation plotting processing as the conventional one in Step S18, the tool movement of the turning tool and the variation in shape of the workpiece 100 are plotted in real time within the second display area of the graphic display screen 73 to show the operator the development of the turning state.

When the reading and plotting of the NC machining program associated with the peripheral turning have completed, and the C-axis movement command for executing the plane cutting of the periphery is read in Step 9, the result of the judgment in Step S14 becomes "true" to allow the processor 11 to advance to Step S15. In Step S15, the processor 11 reads the next one block in advance while maintaining the current position of the pointer.

The processor 11 judges in Step S16 whether or not the block read in Step S15 is a Y-axis movement command, that is, whether the C-axis movement command read in Step S9 is associated with the Y-axis machining or the plane cutting. Since, for example, the C-axis movement command for plane cutting is read in Step S9, the result of judgment in Step S16 becomes "false". Thus, the processor 11 advances to Step S18, in which the simulation processing is carried out in the same manner as the conventional one to update and display the posture of the workpiece 100 within the second display area of the graphic display screen 73. After updating the position of the pointer, which determines the position for reading the program in Step S13, the processor 11 advances to Step S9 in which the next block is read from the NC machining program.

Since the block newly read this time is, for example, a program for plane cutting, the results of judgment in Steps S10, S11 and S14 all become "false". Then, the processor 11, which has advanced for the processing in Step S18, simulates the plane cutting condition of the workpiece 100 based on the tool shape and cutting and tool feeding speed designated by the program through the same processing as the conventional one. The tool movement and the change in shape of the workpiece 100 are the plotted within the second display area of the graphic display screen 73, and the processor updates the position of the pointer for determining the position for reading the program in Step S13.

Afterwards, during repeatedly reading the C-axis movement command relating to the positioning of the spindle for carrying out the peripheral plane cutting and the machining program for plane cutting corresponding to the C-axis movement command, the processor 11 alternately executes the processings in Steps S9 to S11, S14 to S16, S18 and S13, and the processings in Step S9 to S11, S14, S18 and S13. Through the processing in Step S18, the posture of the workpiece 100 is updated and displayed in response to the reading of the C-axis movement command, and the plane cutting condition of the workpiece 100 is simulated in response to the reading of the machining program for plane cutting, thereby displaying in real time the movement of the tool or the change in shape of the workpiece 100 within the second display area of the graphic display screen 73. In the machining example shown in FIG. 5, there exist four points 0°, 90°, 180°, and 270° at which the plane cutting are to be executed, and so these processings are to be repeated four times in total.

When reading of the C-axis movement command (relating to the positioning for peripheral plane cutting) and the machining program (for plane cutting corresponding to the C-axis movement command and associated plotting) are completed, and the C-axis movement command (for carrying out the Y-axis machining) is the next block to be read in Step S9, the result in Step S16 becomes "true". Thus, the processor 11 advances to Step S17 in which the value of display area selection index j is incremented by one, and further to Step S18 in which the simulation processing is carried out in the conventional manner to update and display the posture of the workpiece 100 within the second display area of the graphic display screen 73.

In the machining example of FIG. 5, the value of the spindle's rotational angle θ1 of a C-axis movement command corresponding to the first Y-axis movement command is 0°, so that the plane cut surface of the workpiece 100 at spindle's rotational angle of 0°, which has undergone the first plane cutting and is to be engraved with "N", is plotted orthogonal to the tool 102 on the second display area of the graphic display.

Then, in step S13 the processor 11 updates the position of the pointer for determining the position for reading the program, and advances to Step S9 in which the next one block is read from the NC machining program. Since the newly read one block is for the Y-axis machining, the result of the judgment in Step S11 becomes "true". Thus, the processor 11 proceeds to Step S12 to extract the Y-axis data of the second axis and the Z-axis data in the direction of the spindle from among the coordinate data (X, Y, Z) associated with the Y-axis movement command read this time. Based on the shape of the tool 102 and the values of the tool feed speed, which are designated by the NC machining program, and display area selection index j and display magnification kj, the locus of the movement of the tool is plotted with time in the sub-display area aj of the first display area. At the same time, the X-axis data of the first axis and the Z-axis data in the direction of the spindle are extracted, and the projection is made in the direction of the Y-axis, as the second axis, so that the state of the movement of the tool 102 is simulated. Thus, the present position of the tool 102 is displayed in the second display area in real time in synchronism with the plotting of the locus of the movement of the tool in the sub-display area aj.

In the second display area of the graphic display screen 73, in the same manner as the conventional plotting method, plotted are merely the cutting of the tool 102 in the direction of the X-axis and the movement thereof in the direction of the Z-axis, but the movement path of the tool 102, when the plane cutting surface as an object of Y-axis machining is projected in the direction of axis of the tool, is displayed in unison within the sub-display area aj, thereby enabling the operator to check the NC machining program relating to the Y-axis machining quite effectively, especially when the movement path or cutting width (tool diameter) of the tool 102 on the plane cutting surface is important in a program check.

Then, the processor 11, which has executed the processing in Step S12 based on the Y-axis movement command given by one block of the NC machining program, updates the position of the pointer, which is for determining the position for reading the program (Step S13), and reads the next one block based on the current position of that pointer (Step S9). If the next one block is a Y-axis movement command, the processor 11 executes the judgment processing in Steps S10 and S11, and executes the processing in Step S12 in the same manner as the above. Since the data associated with the Y-axis movement command is given in the form of a Point to Point movement command, three blocks of NC machining data are necessary to engrave a shape such as "N". As described above, however, the values of the display area selection index j are not updated as long as the processing in Steps S9 to S13 are executed repetively by sequentially reading the Y-axis movement command, so that the tool paths corresponding to a series of Y-axis movement commands programmed to perform a machining on the same plane cutting surface are all displayed on the sub-display area aj set corresponding to the plane cut surface. The state of the sub-display area a1 is shown in FIG. 4 when the display of the tool path of "N" has seen completed, following the reading and plotting of the three blocks of Y-axis machining program with respect to the plane cut surface at the spindle's rotational angle 0° in the case of the machining example of FIG. 5. Besides, the tool paths within the sub-display areas A2 to A4 are not displayed at this stage.

When the reading and plotting of a series of Y-axis movement commands associated with a plane cut surface is completed, and the C-axis movement command for executing the next Y-axis machining is read through the processing in Step S9, the processor 11 again executes the processings in Steps S10 and S11, and Steps S14 to S17, to increment by one the value of the display area selection index j. Then, the processor 11 executes the simulation processing in the conventional manner to update and display the posture of the workpiece 100 within the second display area of the graphic display screen 73 (Step S18), again updates the position of the pointer for determining the position to read the program (Step S13), and reads one block of the NC machining program (Y-axis movement command) associated with the next Y-axis machining from the NC machining program (Step S9). Afterwards, the processor 11 executes the same processing as the above based on the value of the display area selection index j updated every time the C-axis movement commands are read. Processor 11 repeatedly executes the plotting processing in Step S12 for the sub-display area for aj and the second display area every one block of the Y-axis machining command is read until the result of judgment in Step S10 for detecting the program end becomes "true", thereby plotting the machining condition of each plane cut surface.

FIG. 4 shows the state of display of the graphic display screen 73 at the time when the result of judgment in Step S10 becomes "true", and the simulation of all the NC machining programs has been completed in the case of the machining example of FIG. 5. As described earlier, within the sub-display area a1 designated by j=1, plotted is a plane cut surface at the spindle rotational angle 0°, that is, a tool path of "N" corresponding to the top surface of the workpiece shape 100 as shown in FIG. 5. Subsequently, within the sub-display areas a2, a3, and a4 designated by j=2, 3, and 4, respectively, plotted are an engraving tool path defined for the plane cut surface at spindle rotational angle 90° corresponding to the front surface of the workpiece shape 100 shown in FIG. 5, an engraving tool path defined for the plane cut surface at the spindle rotational angle 180° corresponding to the bottom surface of the workpiece shape 100, and an engraving tool path defined for the plane cut surface at the spindle rotational angle 270° corresponding to the back surface of the workpiece shape 100, respectively.

The above description has been given of the case, by way of an embodiment, where the first display area set on the left half of the graphic display is divided by the value of number n of the rotational positioning points to obtain vertically equal sub-display areas corresponding in number to the plane cut surfaces to undergo the Y-axis machining, and the tool paths of the Y-axis machining are plotted for each plane cut surface; however, the entirety of the left half of the graphic display may be set as a single first display area even when there are a plurality of plane cut surfaces to be Y-axis machined, and the first display area may be cleared every time the C-axis movement command for the Y-axis machining is newly detected so as to plot the tool path or the tool shape for the next Y-axis machining.

In the animation plotting method of the NC machining program of the present invention, the tool movement path and the tool shape obtained by simulating the NC machining program are displayed at a time on the first and second display areas, thereby enabling the NC machining program to be checked readily and surely even when the NC lathe has a multiplicity of tool rests for complicated tool movements.

We claim:

1. A method of animation plotting by an NC machining program on a graphic display screen of an NC system for an NC lathe having a tool displaceable in three axes including an axis of a spindle, and first and second axes orthogonal to said axis of the spindle and orthogonal to each other, said tool being disposed along said first axis, comprising the steps of:

(a) dividing said graphic display screen into a first display area for simulating a first view of a workpiece projected in a direction of said first axis, and a second display area for simulating a second view of the workpiece projected in a direction of said second axis; and (b) simultaneously displaying a state of movement of said tool relative to said workpiece by simulating said first and second views with said NC machining program in said first display area and said second display area.

2. A method of animation plotting by an NC machining program according to claim 1, wherein the state of movement of said tool relative to said workpiece is displayed in synchronism by a first profile view in said first display area and a second profile view in said second display area in said step (b).

3. A method of animation plotting by an NC machining program according to claim 1, wherein said step (a) includes the step of:

(a1) dividing said first display area into a number of sub-display areas corresponding to a number of rotational positioning points of said spindle for machining by said tool; and wherein said step (b) includes the steps of:

(b1) selecting in sequence one of said sub-display areas through division in accordance with the number of rotational positioning points of said spindle in Step (a1), and (b2) simultaneously displaying the state of movement of said tool relative to said workpiece within the one sub-display area selected in said Step (b1) and said second display area.

4. A method of animation plotting of an NC machining program according to claim 3, wherein the state of movement of said tool relative to said workpiece is displayed in synchronism by a first profile view in said selected one sub-display area and by a second profile view in said second display area in step (b2).

5. A method of animation plotting by an NC machining program on a graphic display screen of machining by an NC lathe having a tool displaceable in three axes including a spindle axis, and first and second axes orthogonal to said spindle axis and each other, and a spindle having a number n of Y-axis machining surfaces to be machined, wherein n is an integer greater than or equal to one, said method comprising the steps of:

detecting the presence of Y-axis machining and the number n of Y-axis machining surfaces on the spindle to be machined;

dividing said graphic display screen into a first display area and a second display area for simulating a view of a workpiece projected in a direction of said second axis;

dividing said first display area into n sub-display areas; and simultaneously displaying a state of movement of said tool relative to said workpiece by simulating respective views within said n sub-display areas and said second display area.

6. A method of animation according to claim 5 further comprising the steps of:

detecting a number n of C-axis rotational angles each corresponding to each of said n Y-axis machining surfaces; and displaying the number n of C-axis rotational angles along with the corresponding n display areas.

* * * * *